(12) United States Patent
Dylia-Spears et al.

(10) Patent No.: US 10,287,457 B2
(45) Date of Patent: May 14, 2019

(54) POLISHING SLURRY PREVENTING AGGLOMERATION OF CHARGED COLLOIDS WITHOUT LOSS OF SURFACE ACTIVITY

(71) Applicant: LAWRENCE LIVERMORE NATIONAL SECURITY, LLC, Livermore, CA (US)

(72) Inventors: Rebecca Dylia-Spears, Dublin, CA (US); Michael Feit, Livermore, CA (US); Phillip E. Miller, Livermore, CA (US); William A. Steele, Tracy, CA (US); Tayyab I. Suratwala, Pleasanton, CA (US); Lana L. Wong, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 332 days.

(21) Appl. No.: 14/437,453

(22) PCT Filed: Oct. 16, 2013

(86) PCT No.: PCT/US2013/065290
§ 371 (c)(1),
(2) Date: Apr. 21, 2015

(87) PCT Pub. No.: WO2014/070461
PCT Pub. Date: May 8, 2014

(65) Prior Publication Data
US 2015/0275048 A1   Oct. 1, 2015

Related U.S. Application Data

(60) Provisional application No. 61/721,588, filed on Nov. 2, 2012.

(51) Int. Cl.
*C09G 1/04* (2006.01)
*B24B 37/04* (2012.01)
(Continued)

(52) U.S. Cl.
CPC .............. *C09G 1/04* (2013.01); *B24B 37/04* (2013.01); *B24B 37/044* (2013.01); *C09G 1/02* (2013.01); *C09K 3/1436* (2013.01); *C09K 3/1463* (2013.01)

(58) Field of Classification Search
None
See application file for complete search history.

(56) References Cited

U.S. PATENT DOCUMENTS

| 5,527,423 A * | 6/1996 | Neville | C23F 3/00 106/3 |
| 5,858,813 A * | 1/1999 | Scherber | C09G 1/02 252/79.2 |

(Continued)

FOREIGN PATENT DOCUMENTS

| EP | 1616927 A1 | 1/2006 |
| JP | 19960257898 | 9/1996 |

(Continued)

OTHER PUBLICATIONS

EP13850914.6, "Extended European Search Report", dated Sep. 5, 2016, 8 pages.

(Continued)

*Primary Examiner* — Allan W. Olsen
(74) *Attorney, Agent, or Firm* — Kilpatrick Townsend & Stockton LLP (57) ABSTRACT

A method for chemically stabilizing polishing slurries in aqueous suspension to prevent their agglomeration while maintaining their surface activity is disclosed. The method prevents the formation of irreversible particle agglomerates (Continued)

during drying and permits the subsequent re-suspension of dried particles with no impact on the particle size distribution. The stabilization method can be customized based on knowledge of the colloid surface charge at suspension pH conditions, addition of a charged species having like charge to the colloid at the suspension conditions, and control of the concentrations of the charged species and other ions in suspension.

15 Claims, 11 Drawing Sheets

(51) Int. Cl.
*C09G 1/02* (2006.01)
*C09K 3/14* (2006.01)

(56) References Cited

U.S. PATENT DOCUMENTS

| | | | | |
|---|---|---|---|---|
| 6,447,373 | B1* | 9/2002 | Lack | C09G 1/02 451/36 |
| 6,561,876 | B1* | 5/2003 | Tateyama | B24B 37/042 257/E21.244 |
| 6,827,752 | B2* | 12/2004 | Nojo | C09G 1/02 106/3 |
| 6,866,793 | B2 | 3/2005 | Singh et al. | |
| 7,144,301 | B2* | 12/2006 | Kim | B24B 37/044 451/36 |
| 7,368,388 | B2* | 5/2008 | Small | B24B 37/044 252/79.1 |
| 7,427,361 | B2* | 9/2008 | Small | B24B 37/044 252/79.1 |
| 8,486,169 | B2* | 7/2013 | Carter | C03C 19/00 438/693 |
| 8,932,479 | B2* | 1/2015 | Kamimura | C09G 1/02 216/2 |
| 9,558,959 | B2* | 1/2017 | Mishra | C09G 1/02 |
| 2002/0086618 | A1* | 7/2002 | Ota | B82Y 30/00 451/41 |
| 2003/0168627 | A1* | 9/2003 | Singh | C09G 1/02 252/79.1 |
| 2004/0055993 | A1 | 3/2004 | Moudgil et al. | |
| 2004/0060502 | A1* | 4/2004 | Singh | C09G 1/02 117/68 |
| 2004/0152316 | A1* | 8/2004 | Ono | C09G 1/02 438/689 |
| 2004/0265177 | A1* | 12/2004 | Nicoli | G01N 15/1456 422/73 |
| 2005/0075052 | A1* | 4/2005 | Kim | B24B 37/044 451/41 |
| 2005/0076581 | A1* | 4/2005 | Small | B24B 37/044 51/307 |
| 2005/0106874 | A1* | 5/2005 | Matsui | C09G 1/02 438/689 |
| 2005/0126080 | A1* | 6/2005 | Kon | H01L 21/31053 51/308 |
| 2005/0287931 | A1* | 12/2005 | Saegusa | C09K 3/1463 451/41 |
| 2006/0234509 | A1* | 10/2006 | Small | B24B 37/044 438/692 |
| 2007/0093187 | A1* | 4/2007 | Takenouchi | C09G 1/02 451/174 |
| 2008/0045018 | A1* | 2/2008 | Yoon | C09G 1/02 438/693 |
| 2008/0045020 | A1* | 2/2008 | Kim | C09G 1/02 438/693 |
| 2008/0086950 | A1* | 4/2008 | Kon | C09G 1/02 51/306 |
| 2008/0227297 | A1* | 9/2008 | Matsui | B24B 37/044 438/693 |
| 2009/0258493 | A1* | 10/2009 | Matsui | B24B 37/044 438/693 |
| 2009/0321390 | A1 | 12/2009 | Li | |
| 2009/0325323 | A1 | 12/2009 | Ueno et al. | |
| 2010/0178768 | A1 | 7/2010 | Li et al. | |
| 2010/0252774 | A1* | 10/2010 | Shida | C09K 3/1409 252/79.1 |
| 2011/0114872 | A1* | 5/2011 | Kroell | C09G 1/02 252/79.1 |
| 2012/0270343 | A1* | 10/2012 | Jiang | H01L 21/31053 438/16 |

FOREIGN PATENT DOCUMENTS

| | | |
|---|---|---|
| JP | 08257898 A | 10/1996 |
| JP | 2000269169 A | 9/2000 |
| WO | 2014070461 A1 | 5/2014 |

OTHER PUBLICATIONS

EP13850914.6, "Office Action", dated May 19, 2016, 3 pages.
PCT/US2013/065290, "International Search Report and Written Opinion", PCT/US2013/065290, dated Feb. 21, 2014, 17 pages.
JP2015540689, "Office Action", dated Nov. 17, 2017, 14 pages.
JP2015-540689, "Notice of Allowance", dated Mar. 6, 2018, 3 pages.

* cited by examiner

POLISHING SLURRY PREVENTING AGGLOMERATION OF CHARGED COLLOIDS WITHOUT LOSS OF SURFACE ACTIVITY

CROSS-REFERENCES TO RELATED APPLICATIONS

This application claims priority to U.S. Provisional Patent Application No. 61/721,588, filed on Nov. 2, 2012, the disclosure of which is hereby incorporated by reference in its entirety for all purposes. This application is related to PCT Application No. PCT/US2012/029837, filed on Mar. 20, 2012, the content of which is incorporated by reference herein in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND OF THE INVENTION

Agglomeration of solid colloidal particles is a well-known problem. Conventionally, agglomeration of colloids is prevented using either electrostatic stabilization or steric stabilization. In electrostatic stabilization, the surface charge of the colloids is adjusted to increase the electrostatic repulsion between particles. However, the addition of salts or change in working pH required to affect this change may not be practical. In addition, this method may not be effective for the colloid of interest. Steric stabilization typically involves either chemically or physically attaching larger molecules, often surfactants or polymers, to the colloid surfaces. The large molecules act as bumpers, preventing the surfaces of two particles from approaching near enough to be influenced by van der Waals or Coulombic forces. Unfortunately, these large molecules also block active sites on the colloid surface, which renders them inaccessible for binding or chemical reaction. Colloids stabilized in this way often exhibit reduced activity.

Thus, there is a need in the art for more effective ways of preventing agglomeration of colloidal particles in a suspension without compromising their activity.

SUMMARY OF THE INVENTION

Embodiments of the present invention generally relate to aqueous suspensions that include solid colloidal particles. More specifically, certain embodiments of the present invention provide a method for stabilizing a suspension to prevent agglomeration of such colloidal particles while maintaining the chemical or mechanical activity level of these particles.

Some embodiments of the present invention provide a suspension that includes a solvent and a plurality of solid particles supported in the solvent. Each of the plurality of solid particles has a first charge layer that has a first polarity and is disposed over an outer surface of the solid particle and a second charge layer (referred to herein as the electric double layer (EDL) that overlies the first charge layer that has a second polarity that is different from the first polarity. The suspension also includes a charged species that has a plurality of charged ions/particles/molecules, which have a charge polarity that is same as the first polarity. At least some of the plurality of the charged species is attached to the second charge layer. In some embodiments, the first polarity may be negative and the second polarity may be positive. In other embodiments, the first polarity may be positive and the second polarity may be negative. In a particular embodiment, the surfactant may include anions or cations based on the first polarity of the first charge layer. Some examples of surfactants include Ammonium Lauryl Sulphate (ALS), Sodium Dodecyl Benzene Sulfonate, Phosphate esters, or Cetyl trimethylammonium bromide (CTAB). In some embodiments, the surfactant may include an anionic surfactant if the first polarity is negative or the surfactant may include a cationic surfactant if the first polarity is positive.

In an embodiment, a system for polishing a substrate is provided. The system comprises a polishing unit including a polishing pad and a slurry delivery system operable to provide slurry to the polishing pad. The slurry may further include a solvent and a plurality of solid particles supported in the solvent. Each of the plurality of solid particles may further include (i) a first charge layer disposed proximate to an outer surface of the solid particle where the first charge layer has a first polarity and (ii) a second charge layer overlying the first charge layer and which has a second polarity opposite from the first polarity. The slurry may also include charged species that have a plurality of ions, particles or molecules, which have a third polarity. At least some of the plurality of charged species is directly attached to the second charge layer. In a particular embodiment, the third polarity is same as the first polarity and the charged species may include a surfactant. In some embodiments, the first polarity may be negative. In an embodiment, the surfactant can include one of Ammonium Lauryl Sulphate (ALS), Sodium Dodecyl Benzene Sulfonate, Phosphate esters, or Cetyl trimethylammonium bromide (CTAB). In a particular embodiment, the surfactant includes a cationic surfactant. In certain embodiments, the slurry can include ceria, zirconia, alumina, or silica based compound. In a specific embodiment, the substrate is a silica-based optical component.

Another embodiment of the present invention provides a slurry that includes a solvent and a plurality of solid ceria particles provided in the solvent. Each solid ceria particle may be surrounded by an electric double layer. The electric double layer may include (i) a first charge layer disposed along an outer surface of the ceria particle and having a first polarity and (ii) a second charge layer disposed over the first charge layer and having a second polarity. The slurry may also include a surfactant that includes a plurality of cations and at least some of the plurality of cations may be attached to the second charge layer of the ceria particle. In some embodiments, the first polarity is opposite from the second polarity. In an embodiment, the second polarity is positive. In certain embodiments, the stabilizing ionic species having the third polarity are separable from the second charge layer by application of a shear force and may reattach to the second charge layer after removal of the shear force. The shear force, manifested as e.g., fluid flow or abrasion, can be generated either mechanically or electrically.

These and other embodiments of the invention along with many of its advantages and features are described in more detail in conjunction with the text below and attached figures.

DETAILED DESCRIPTION OF SPECIFIC EMBODIMENTS

Embodiments of the present invention provide a method for stabilizing a suspension that includes charged colloidal particles. Other embodiments of the present invention provide a stabilized slurry for use in polishing of substrates, e.g., silica-based optical components and other types of substrates.

Solid surfaces in an aqueous suspension carry a charge. Ions in the suspension that have an opposite charge than the solid will assemble around the surface in two layers, termed the electric double layer (EDL). The layer nearest to the surface of the solid particle is tightly bound to the particle. The outer layer is diffuse and weakly bound to the solid particle because it includes free ions which move in the fluid under the influence of electrical attraction and thermal motion rather than being firmly bound. This weak outer layer is referred to as a "diffuse layer". Embodiments of the present invention provide a chemical stabilizer or stabilizing agent—e.g., a charged species—that binds to the diffuse layer surrounding the colloidal particles, rather than binding to the particle surface. The charged species sterically hinders the particles from close approach, preventing them from aggregating. However, because the charged species are weakly incorporated within the diffuse layer rather than tightly bound to the particle surface, shear forces—such as those created by flow, or mechanical action such as grinding or polishing—are enough to tear the stabilizing charged species away from the double layer. Once the charged species is removed, the functional sites on the surface of the colloidal particle are exposed and become available for binding or chemical reaction. When the shear forces on the colloids cease, the stabilizing agent (or charged species) re-associate with the diffuse layer of the EDL and again sterically stabilize the particles, thus preventing agglomeration or aggregation. This EDL binding method prevents the colloids from agglomerating, while preserving their surface functionality.

Figure 1A:
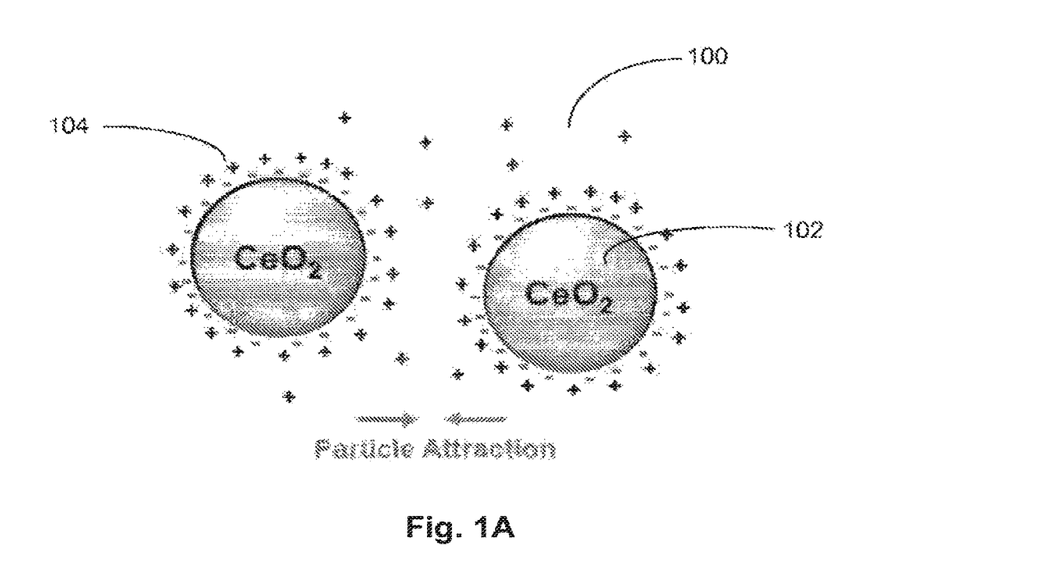
FIG. 1A is a schematic that illustrates two colloidal particles with the electric double layer and present in a suspension according to an embodiment of the present invention.

FIG. 1A is a schematic that illustrates two colloidal particles with the electric double layer present in a suspension 100 according to an embodiment of the present invention. Each particle 102 has a surface charge associated with it. As illustrated in FIG. 1A, particle 102 has a −ve (negative) charge at its surface. It is to be understood that the method and techniques described below are equally applicable to particles that may have a +ve (positive) charge at its surface. The negative charge at the surface of particle 102 may or may not be evenly distributed. A portion of the suspension 100 that is in close proximity to particle 102 may be positively charged. This results in formation of a diffuse layer 104 over each particle 102. Diffuse layer 104 may have an overall positive charge and may surround and in some cases completely encompasses particle 102.

Figure 1B:
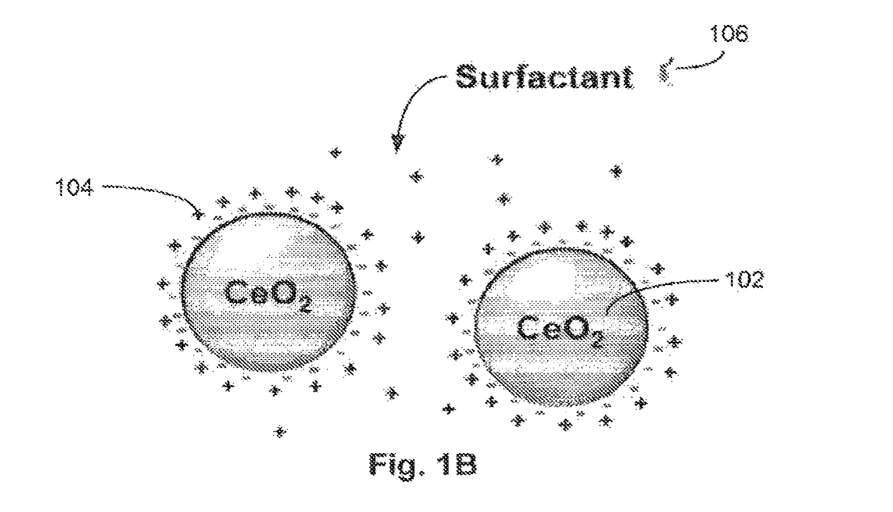
FIG. 1B illustrates adding of charged surfactant ions to the suspension of FIG. 1A, according to an embodiment of the present invention.

In a particular embodiment, the pH of the suspension is maintained at a level that is greater than the isoelectric point of the colloidal particles in the suspension. In addition a charged species 106 having an opposite charge from that of outer diffuse layer 104 (and having the same charge as that at the surface of the particle) is added to the suspension, as illustrated in FIG. 1B. For example, since diffuse layer 104 has a +ve charge in our example, charged species 106 that is added to the suspension may have a net −ve charge (e.g., an anionic surfactant). In some embodiments, the charged species may be a surfactant as illustrated in FIG. 1B. A surfactant usually has a head and one or two tails. The tails of the surfactant act as "bumpers" and prevent other particles from attaching to the particle to which the surfactant is attached. The head of the surfactant carries the charge and attaches itself to other charged layers, in this example diffuse layer 104.

Figure 1C:
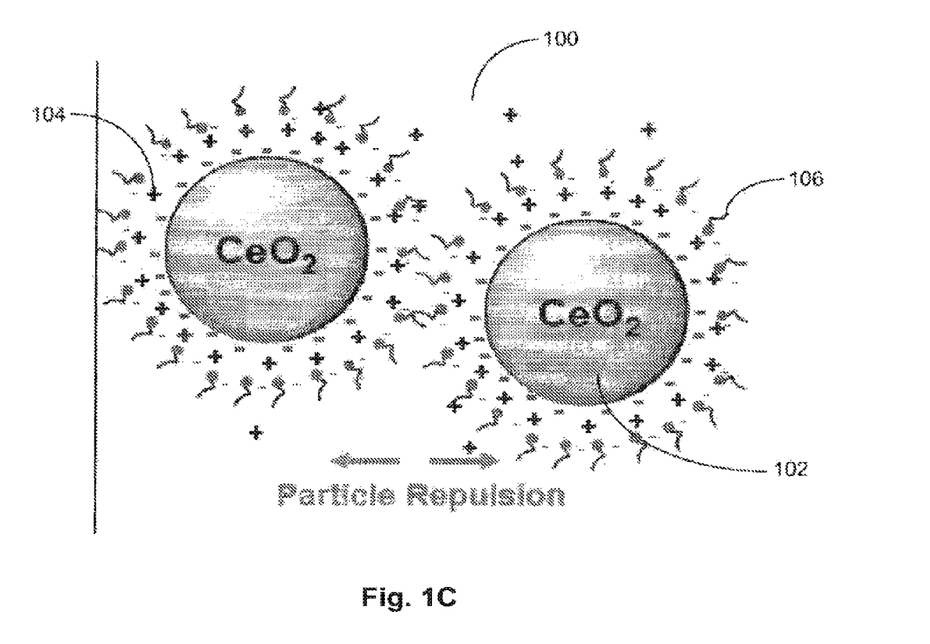
FIG. 1C illustrates the suspension after the surfactant ions attach themselves to the outer layer of the electric double layer according to an embodiment of the present invention.

Since charged species 106 has a charge that is opposite to the charge of outer diffuse layer 104, charged species 106 attaches itself to outer diffuse layer 104 rather than to the surface of particle 102, as illustrated in FIG. 1C. However, since the charge at the outer diffuse layer 104 is not as strong, it is possible to easily dislodge charged species 106 from particle 102 by application of a shear force, e.g., fluid motion, a mechanical force, or an electrical force.

Particles 102 described above may be part of a suspension that is used in some type of physical or chemical process and hence it is important that the particles remain in an active state when the physical or chemical process is being performed. Conventional techniques where a surfactant is bound to the surface of a charged particle often reduce the activity of the charged particle since it is very hard to dislodge the surfactant from the tight bond that it has with the surface of the charged particle. One of the advantages of the embodiments of the present invention is that since the charged species is loosely bound to the outer diffuse layer of the charged particle, it can be easily dislodged from the particle by applying a force. When that force is removed, the charged species then re-attaches itself to the outer diffuse layer and acts to prevent agglomeration of the particles. Thus, embodiments of the present invention provide the benefit of preventing agglomeration of particles when the suspension is idle (i.e. when the suspension is not being used in any process) and easy dislodgment of the charged species to return the particles to their active state when needed. None of the conventional techniques provide such a benefit.

In addition, conventional wisdom suggests that using a charged species having a like charge as that at the surface of the colloidal particle will not work since it is widely understood that like charges repel each other. Thus, such a charged species that has the same polarity of charge as that at the surface of the particle, would not attach itself to the particle. However, embodiments of the present invention provide techniques for adding a charged species having the same charge as that at the surface of a colloidal particle and coupling the charged species to the particle using an outer oppositely charged layer, referred to herein as the diffuse layer. The resulting coupling of the charged species to the particle is strong enough to prevent agglomeration but is also weak enough so that the charged species can be decoupled from the particle by application of a shear force as described above. This has not been attempted before and is contrary to the conventional wisdom prevalent in the industry as of the present day.

Figure 2:
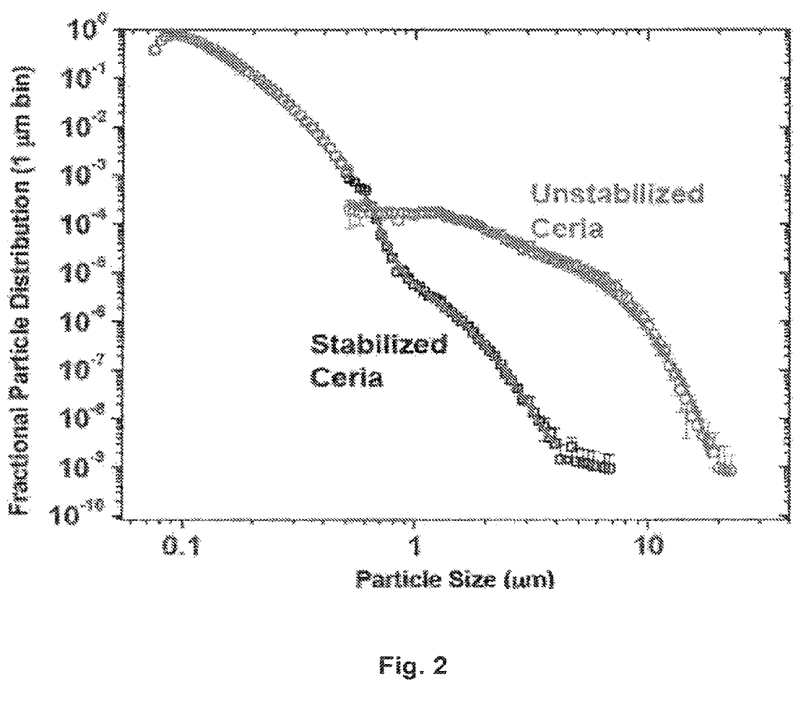
FIG. 2 is a graph illustrating particle distribution in suspensions stabilized according to an embodiment of the present invention.

FIG. 2 is a graph showing the effects of adding a charged species, e.g., a surfactant, to a suspension according to an embodiment of the present invention. As an example, the effects on ceria slurry are illustrated in FIG. 2. However, it is to be understood, the embodiments described herein are not limited to ceria slurries or to optical polishing slurries and are equally applicable to any suspension in which there is a need to prevent agglomeration of colloidal particles. As can be seen in FIG. 2, without the presence of the surfactant, there is considerable agglomeration of particles leading to particles having a size of 1 μm or larger. These larger particles can cause significant degradation in the performance of the ceria slurry and make it unsuitable for the intended process, e.g., chemical mechanical polishing. After addition of the surfactant as described herein, it can be seen that the agglomeration of these particles is significantly reduced. For example, in the ceria slurry illustrated in FIG. 2, in the un-stabilized slurry (i.e. when the slurry does not include the surfactant) (i) 1 out of $10^4$ particles is an agglomerate, (ii) agglomerated particle sizes ranged between 1 and 10 μm, and (iii) average size of an agglomerated particle was about 2 μn. After addition of the surfactant to the ceria slurry and stabilizing the slurry, (i) 1 out of $10^6$ particles was an agglomerate, a full two orders of magnitude improvement over the un-stabilized slurry, (ii) agglomerated particle sizes ranged between 1 and 4 μm, and (iii) average size of an agglomerated particle was about 1 μm, an almost 50% reduction in average agglomerated particle size over the un-stabilized slurry.

As described above, it is not enough just to prevent agglomeration of particles in a suspension when that suspension is also to be used to perform a mechanical or chemical process. In this instance, it is equally important that the particles be returned to their active state where they can affect the process in which the suspension may be used. For example, ceria slurry is often used for polishing substrates, such as glass or silicon. When a charged species is attached to the ceria particles in the slurry, the particles may become ineffective for the polishing process. In order for the particles to be used in the polishing process, the charged species attached to the particles need to be dislodged so that the charged ceria particles are returned to their active state. In slurries stabilized using conventional means, it may be difficult to dislodge the surfactant from the surface of the ceria particles due to their strong bond. This results in a ceria slurry that may resist agglomeration but which also has diminished polishing properties. In contrast, ceria slurry stabilized using embodiments of the present invention shows enhanced polishing properties in addition to reducing the agglomeration.

Figure 3A:
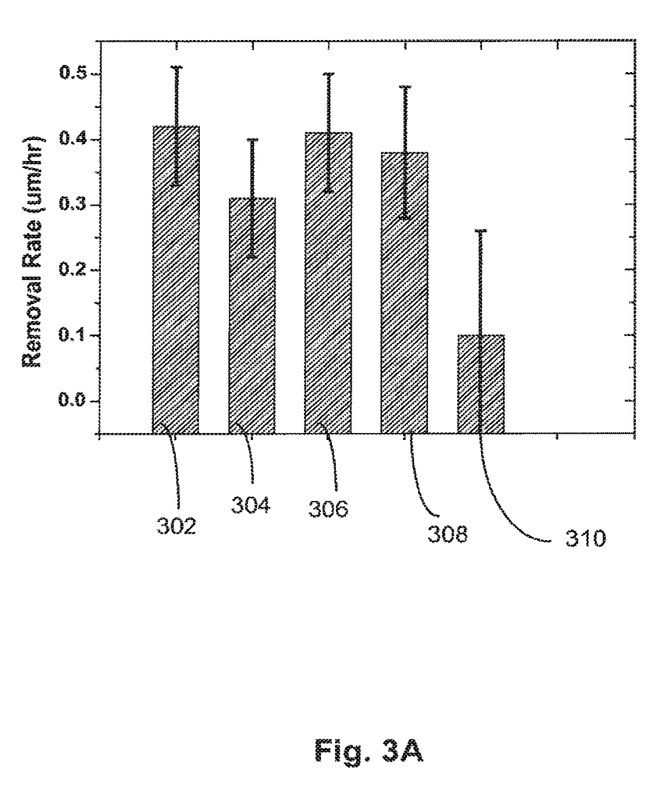
FIG. 3A is a graph illustrating comparison of removal rates for a slurry stabilized using embodiments of the present invention and a slurry stabilized using conventional techniques.

FIG. 3A illustrates a graph showing removal rates for a ceria slurry that has been stabilized using embodiments of the present invention compared to the ceria slurry that is stabilized using conventional techniques. As can be seen from FIG. 3A, slurries 302, 304, 306, and 308 are stabilized using embodiments of the present invention. Each of slurries 302, 304, 306, and 308 was stabilized using one of the charged species described above with the slurries being at different pH levels. Slurry 310 was stabilized using conventional techniques described above. It can be seen that slurries 302, 304, 306, and 308 have a much higher removal rate than slurry 310. This further proves that a slurry stabilized using embodiments of the present invention have a higher removal rate compared to a slurry stabilized using conventional techniques.

Figure 3B:
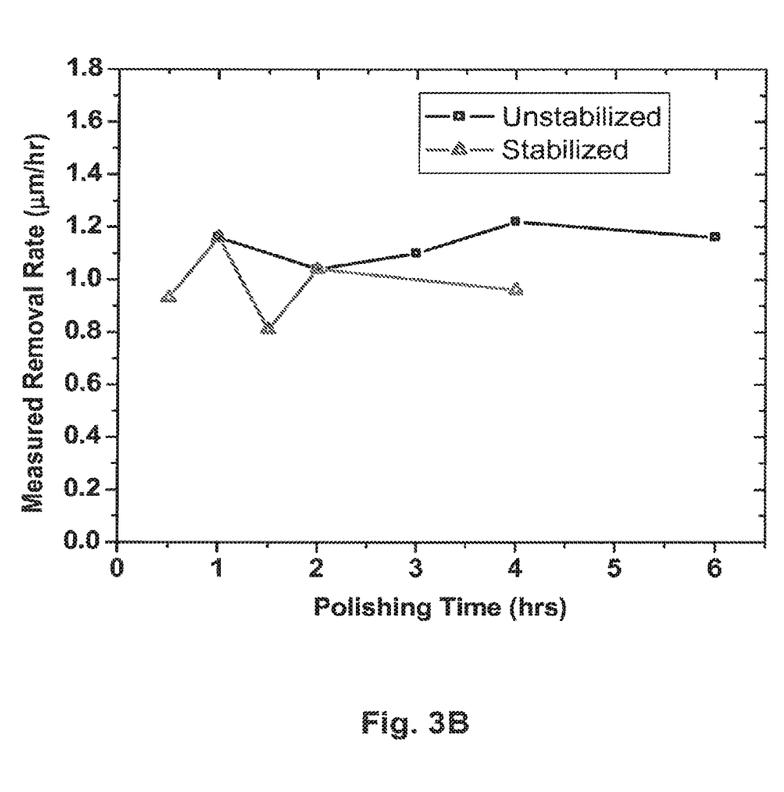
FIG. 3B is a graph illustrating removal rates of a specific slurry stabilized using embodiments of the present invention compared to the un-stabilized form of the same slurry.

FIG. 3B illustrates a graph showing comparison of removal rates for un-stabilized ceria slurry and ceria slurry that was stabilized using embodiments of the present invention. The removal rate is a measure of the effectivity of ceria slurry during the polishing process. As can be seen from FIG. 3A, the removal rate for ceria slurry stabilized using embodiments of the present invention significantly exceeds that of ceria slurry stabilized using conventional techniques. Further, it can be seen from FIG. 3B that the removal rate of the slurry stabilized using embodiment of the present invention is substantially similar to removal rate of un-stabilized slurry thus proving that the removal rate is not affected by addition of the charged species.

As described above, embodiments of the present invention provide a method for adding a surfactant that has a charge polarity that is opposite to the polarity of the outer diffuse layer of the charged colloidal particle and has the same charge polarity as the charge at the surface of the colloidal particle. Some of the compounds that can be used as surfactants can include cationic as well as anionic surfactants. Charged species that are used as stabilizing agents may include but are not limited to surfactant molecules combining a branched or linear alkyl or alkyl-ether tail and a charge-carrying head group (e.g. sulfate, sulfonate, phosphate, amine, quaternary ammonium, or carboxyl). Some specific examples of surfactants that can be used in embodiments of the present invention include but are not limited to Ammonium Lauryl Sulphate (ALS), Sodium Dodecyl Benzene Sulfonate, Phosphate esters, Cetyl trimethylammonium bromide (CTAB), and the like. The choice of the stabilizing agent/charged species depends on the charge associated with the colloidal particle of interest. For example, if the colloidal particle has a negative surface charge and positively charged diffuse layer, then an anionic surfactant may be used. On the other hand, if the colloidal particle has a positive surface charge and negatively charged diffuse layer, then a cationic surfactant may be used.

The amount of charged species needed for stabilizing a particular suspension depends of various factors such as pH of the suspension relative to the isoelectric point, the size and number density of the particles to be stabilized, the charge of the stabilizing agent, ionic strength of the suspension, etc. In a particular embodiment where a surfactant is used as the stabilizing agent, the concentration of the surfactant can range between 0.01% to about 2% of the volume of the suspension to be stabilized.

Although ceria is used herein as an example to describe the various embodiments of the invention, it is to be understood that the embodiments described herein can be used in many other types of suspensions such as those containing zirconia, alumina, silica-based compounds, suspensions containing inorganic particles such as those used in catalysts, paints/coatings, inks, sunscreens, makeup, etc., or even suspensions that have organic colloidal particles such as polystyrene latex spheres, etc.

Figure 4A:
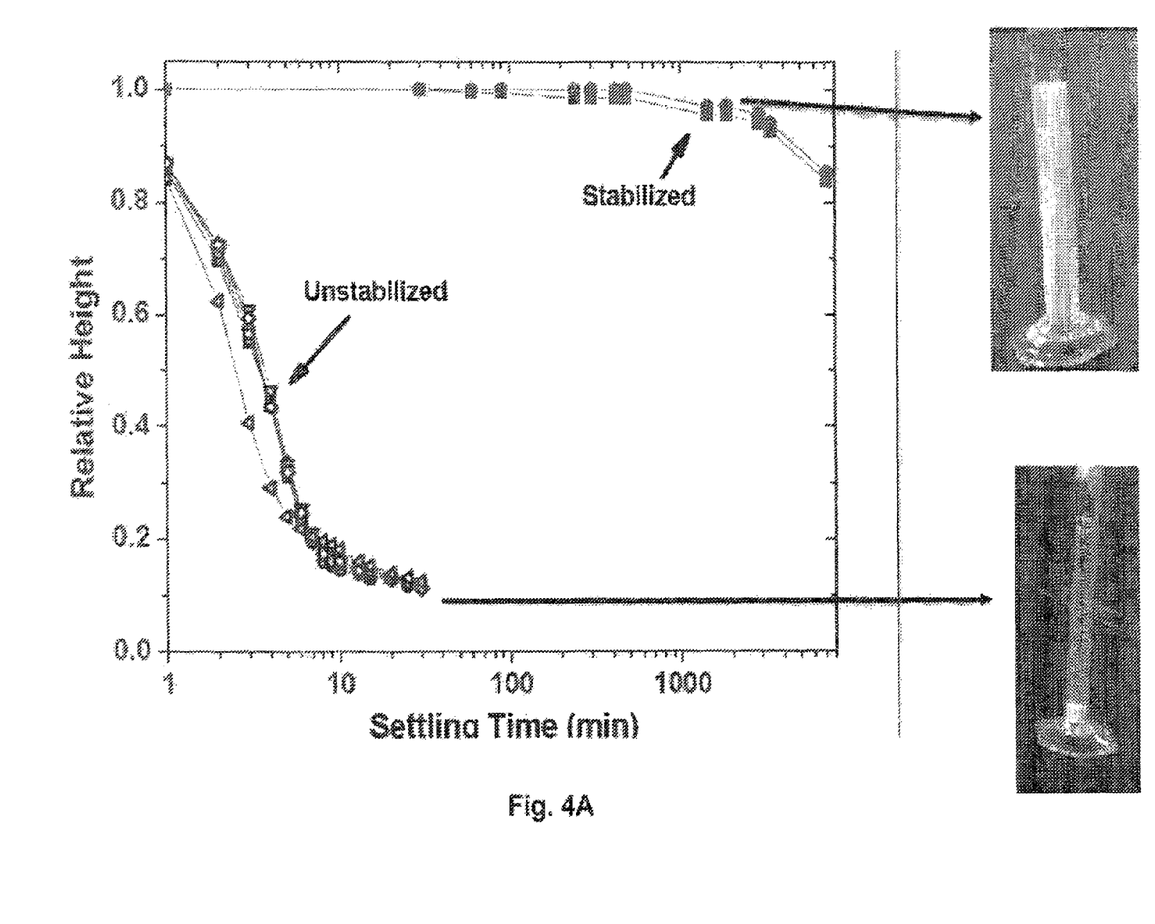
FIG. 4A illustrates the effect on settling time of a suspension when stabilized using embodiments of the present invention.

Another aspect that affects the effectiveness of a suspension having solid colloidal particles is the settling time. Settling is a phenomenon where the solid particles within a suspension settle down at the bottom of the container in which the suspension is stored thus separating the liquid phase from the solid. An un-stabilized or poorly stabilized suspension will experience rapid settling without some form of agitation. The separation of the solid particles from the liquid portion of the suspension results in decreased efficacy of the suspension. FIG. 4A is a graph that illustrates the effect of stabilization on the settling behavior of ceria slurry according to an embodiment of the present invention. As can be seen from FIG. 4A, the un-stabilized or poorly stabilized slurry experiences settling within minutes of being idle, while slurry stabilized using embodiments of the present invention remains in a homogenous for a longer period of time, indicating minimal to no agglomeration of particles in the slurry. In addition, a slurry stabilized using embodiments of the present invention can be re-dispersed very easily even after a long idle time, e.g., a year or so. In other words, the charged species added to a suspension according to embodiments of the present invention are effective in preventing and/or minimizing agglomeration of particles over a long period of time.

Figure 4B:
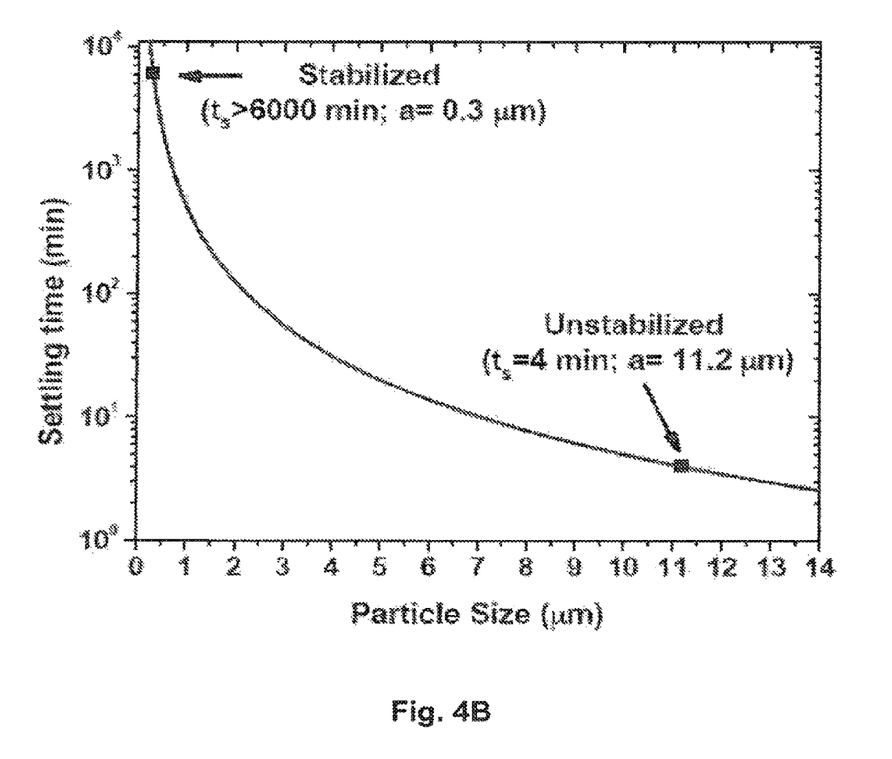
FIG. 4B illustrates a graph showing settling time as a function of particle size for ceria slurry according to an embodiment of the present invention.

FIG. 4B illustrates a graph showing settling time as a function of particle size for ceria slurry according to an embodiment of the present invention. As can be seen in FIG. 4B, ceria slurry stabilized using embodiments of the present invention exhibits settling times typical of very low average particle size while un-stabilized ceria slurry settles quickly, which is indicative of high average particle size and which suggests the presence of significant levels of agglomerated particles. The relation between settling time and particle size is given by the equation $$t_s = \frac{18\eta_L}{a^2 g (\rho_P - \rho_L) d_s} \quad (1)$$

Where $t_s$=settling time; $\eta_L$=water viscosity (0.01 poise); $a$=particle size (μm); g=9.8 m/s$^2$; $\rho_P$=ceria density (7.1 gm/cm$^3$); $\rho_L$=water density (1 gm/cm$^3$); and $d_s$ settling distance.

Figure 5A:
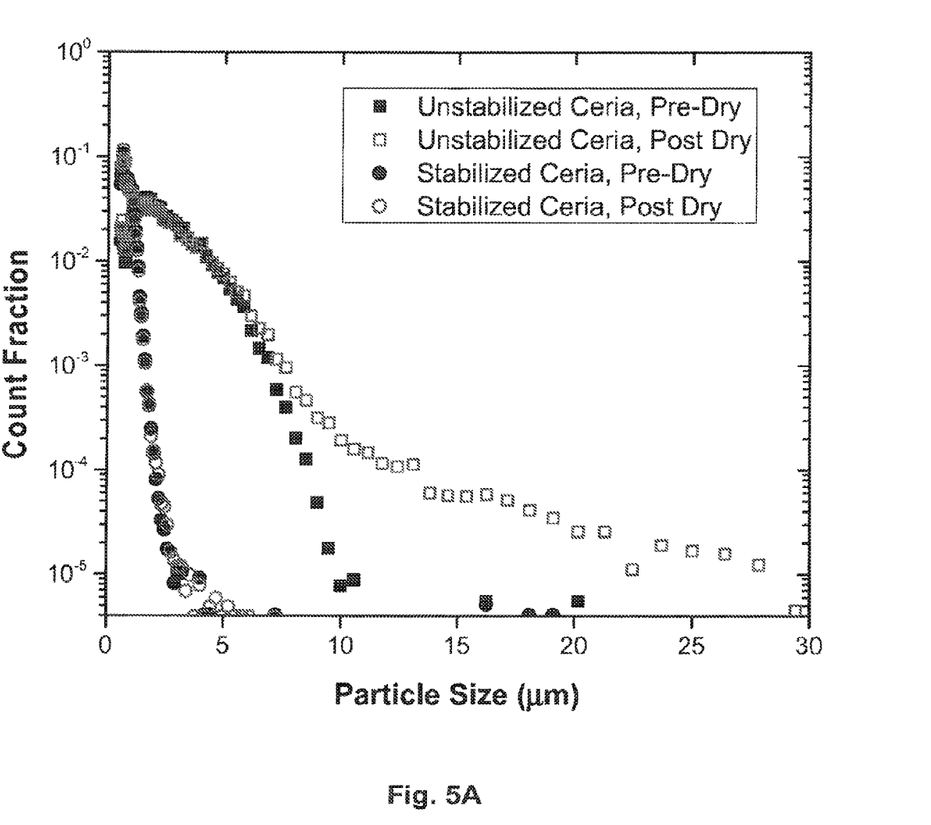
FIG. 5A is a graph illustrating particle distribution in ceria slurry that has been stabilized using a surfactant according to an embodiment of the present invention and subsequently dried and re-dispersed.

Another advantage of stabilizing a suspension, e.g., a slurry, using embodiments of the present invention is that upon drying the slurry does not form irreversibly agglomerated particles making it easier to re-disperse the settled slurry for use. FIG. 5A is a graph that depicts the effect on particle size distribution of drying and then re-suspending un-stabilized slurry vs. slurry stabilized using a charged species according to an embodiment of the present invention. As can be seen in FIG. 5A, drying the un-stabilized slurry generates huge agglomerated particles, e.g., on the order of 10-30 μm particle size that are not broken apart upon re-suspension. Such agglomerates prevent the re-use of the slurry. In contrast, drying and re-suspending a slurry stabilized using embodiments of the present invention results in virtually no difference in particle size before and after the particles are re-suspended following drying.

Figure 5B:
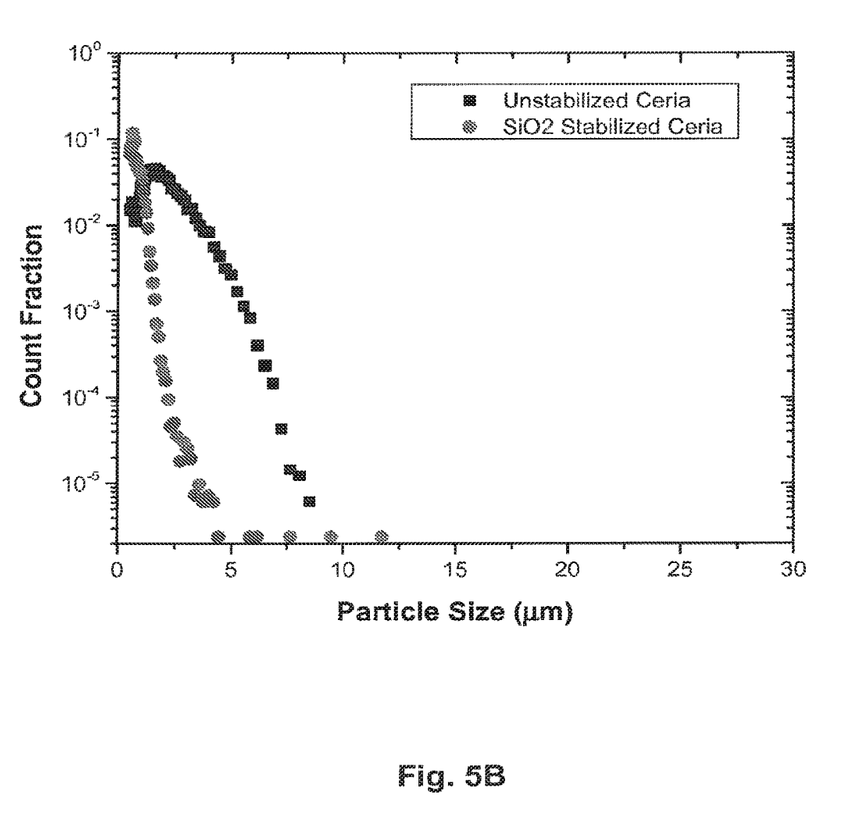
FIG. 5B is a graph illustrating particle size distribution in un-stabilized ceria slurry and ceria slurry stabilized using silica nanoparticles according to another embodiment of the present invention.

It is to be noted that stabilizing agents other than a surfactant may also be used to stabilize a suspension to prevent agglomeration of particles. FIG. 5B is a graph that shows particle size distribution in un-stabilized ceria slurry and in ceria slurry stabilized using silica nanoparticles ($SiO_2$) according to another embodiment of the present invention. As can be seen in FIG. 5B, the average particle size in the stabilized ceria slurry is smaller than the un-stabilized ceria slurry. The silica nanoparticles generally have negative charge above pH of 2, which helps them attach to the diffuse layer described above. In some embodiments, the concentration of the silica nanoparticles can range between 0.5 to 50 mg/ml of the suspension.

In a particular embodiment of the present invention, a ceria slurry stabilized using the embodiments of the present invention can be used in a polishing system for polishing silica-based optical components. Details of the polishing system are provided in PCT Application No. PCT/US2012/029837.

Figure 6:
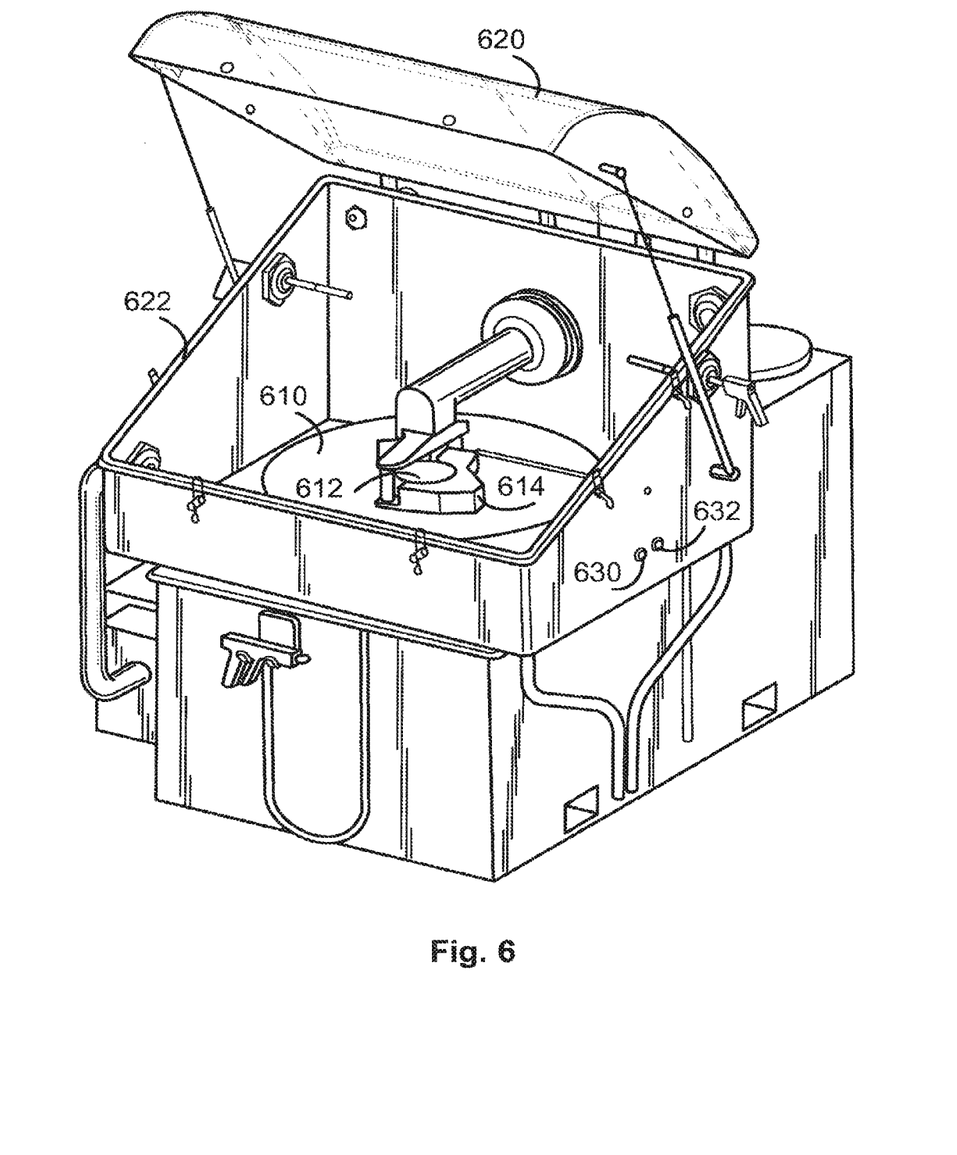
FIG. 6 is simplified perspective diagram of a polishing system that can use polishing slurry stabilized according to an embodiment of the present invention.

FIG. 6 is a simplified perspective diagram of a polishing system according to an embodiment of the present invention. Polishing slurry stabilized using the embodiments of the present invention may be used in polishing system illustrated in FIG. 6. The polishing system 600 includes a polishing surface 610, which can be a polishing pad, and a substrate 612 partially surrounded by a septum 614. A moveable cover 620 is able to be positioned in contact with an enclosure 622 to form a controlled environment surrounding the polishing surface. Input and output ports for polishing slurry (not shown) and an input port 630 and an output port 632 for a humid gas (e.g., water vapor) are provided as part of the system.

Figure 7:
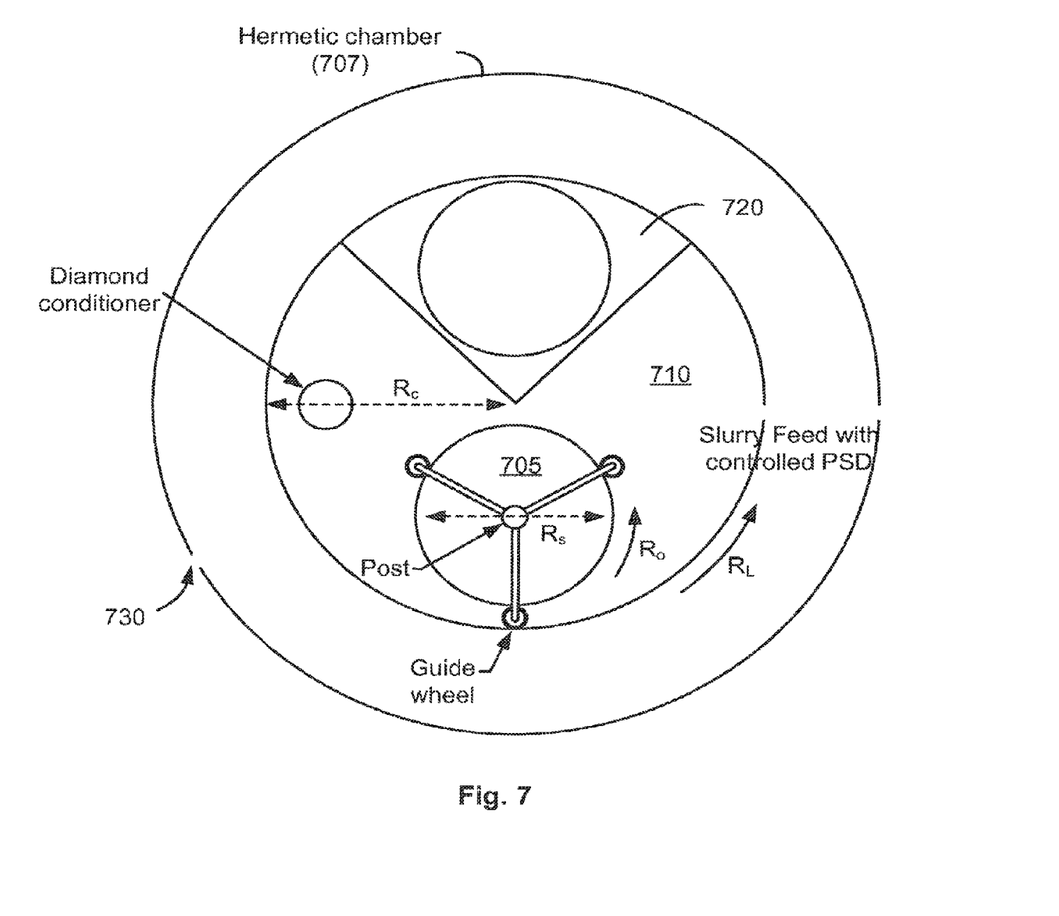
FIG. 7 is a simplified plan view of a portion of a polishing system according to an embodiment of the present invention.

FIG. 7 is a simplified plan view of a portion of a polishing system according to another embodiment of the present invention. As illustrated in FIG. 7, an optic 705 is placed on a lap 710 and spatially controlled using guide wheels. In the embodiment illustrated in FIG. 7, a different septum design is used in which a mirror septum 720 is provided to produce uniform pad wear. A 100% humidity feed port 730 is provided adjacent the lap 710 so that the polishing environment can provide the desired controlled high humidity atmosphere in a manner similar to a sealed chamber (e.g., a hermetic chamber 707). Embodiments of the present invention are not limited to the design illustrated in FIG. 7, but this embodiment is provided merely by way of example. A polishing compound stabilized using the embodiments of the present invention may be used in polishing system illustrated in FIG. 7.

It is to be noted that the particular polishing systems described above in connection with FIGS. 6 and 7 are merely examples and should not be construed to narrow the use of the slurry to only these polishing systems. One skilled in the art will realize that the slurry according to the embodiments of the present invention can be used in various other polishing systems such as pitch polishing, etc.

Several advantages are realized using embodiments of the present invention described above. A suspension treated as described above experiences reduced settling. In addition such a stabilized suspension is easier to re-suspend after drying and/or settling. Another advantage of a suspension stabilized using embodiments of the present invention is that any filtration system that may be used in conjunction with the suspension can be more effective and have a higher lifetime since there is less agglomeration of particles and hence reduced load on the filtration equipment. Also, since the average particle size is reduced in the embodiments described above, there is less build-up of particles at the filter further increasing the filter lifetime and reducing the costs associated with filter changes and slurry replenishment. Preventing agglomeration of suspended particles using embodiments of the present invention leads to easier clean-up of the suspension following drying since the particles now have reduced internal adhesion and reduced adhesion to other surfaces that they may come in contact with. By preventing agglomeration of particles, large particles may be prevented from forming which leads to reduced scratching of substrate surfaces when the suspension is used in a polishing-type application. In addition, by preventing agglomeration, the average particle size can be kept smaller which helps in the overall performance of the suspension and may lead to less usage of the suspension.

While a number of specific embodiments were disclosed with specific features, a person of skill in the art will recognize instances where the features of one embodiment can be combined with the features of another embodiment. Also, those skilled in the art will recognize, or be able to ascertain using no more than routine experimentation, many equivalents to the specific embodiments of the inventions described herein. Such equivalents are intended to be encompassed by the following claims.

What is claimed is:

1. A polishing slurry in suspension in a container, the polishing slurry comprising:
    a solvent disposed in the container;
    a plurality of ceria particles disposed in the container and supported in the solvent, wherein each of the plurality of ceria particles has a negative surface charge distributed over an outer surface of the ceria particle, wherein the solvent forms a positive charge layer around each ceria particle, the positive charge layer including ions that are more tightly bound to the ceria particle and diffuse ions that are more weakly bound to the ceria particle; and
    a plurality of negatively charged species disposed in the container and comprising at least one of Ammonium Lauryl Sulfate (ALS), Sodium Dodecyl Benzene Sulfonate, or a phosphate ester, wherein at least some of the plurality of the negatively charged species are attached to the diffuse ions of the positive charge layer.

2. The polishing slurry in suspension of claim 1 wherein the plurality of negatively charged species comprises surfactants, particles, or molecules.

3. The polishing slurry in suspension of claim 1 wherein each of the plurality of negatively charged species comprises (i) a branched or linear alkyl or alkyl-ether tail and (ii) a charge-carrying head group comprising sulfate, sulfonate, phosphate, or carboxyl.

4. The polishing slurry in suspension of claim 1 wherein the plurality of negatively charged species comprises an anionic surfactant.

5. The polishing slurry in suspension of claim 4 wherein a molecular weight of the anionic surfactant is less than or equal to 384 g/mol.

6. The polishing slurry in suspension of claim 1 wherein the at least some of the plurality of the negatively charged species are separable from the diffuse ions by application of a shear force.

7. The polishing slurry in suspension of claim 6 wherein the at least some of the plurality of the negatively charged species reattach to the diffuse ions after removal of the shear force.

8. The polishing slurry in suspension of claim 1 wherein the polishing slurry consists of the solvent, the plurality of ceria particles, and the plurality of negatively charged species.

9. The polishing slurry in suspension of claim 1 wherein the plurality of negatively charged species consists of a single surfactant.

10. A polishing slurry in suspension in a container, the polishing slurry comprising:
    a solvent including solvent ions, wherein the solvent is disposed in the container;
    a plurality of ceria particles disposed in the container and supported in the solvent; and
    a stabilizing agent disposed in the container, comprising at least one of Ammonium Lauryl Sulfate (ALS), Sodium Dodecyl Benzene Sulfonate, or a phosphate ester, and including stabilizing agent ions;
    wherein:
        each ceria particle has a negative surface charge distributed across an outer surface of the ceria particle;
        the solvent ions are positively charged and form, around each ceria particle, a corresponding layer in which solvent ions closest to the ceria particle are more tightly bound to the ceria particle, and in which solvent ions farther from the ceria particle are diffuse and more weakly bound to the ceria particle; and
        the stabilizing agent ions are negatively charged and attached to the more weakly bound solvent ions, away from the outer surfaces of the ceria particles.

11. The polishing slurry in suspension of claim 10, wherein the stabilizing agent ions are separable from the more weakly bound solvent ions by application of a shear force.

12. The polishing slurry in suspension of claim 11, wherein the stabilizing agent ions reattach to the more weakly bound solvent ions after removal of the shear force.

13. The polishing slurry in suspension of claim 10 wherein the polishing slurry consists of the solvent, the plurality of ceria particles, and the stabilizing agent.

14. The polishing slurry in suspension of claim 10 wherein the stabilizing agent consists of a single anionic surfactant.

15. The polishing slurry in suspension of claim 10 wherein a molecular weight of the stabilizing agent is less than or equal to 384 g/mol.

* * * * *

UNITED STATES PATENT AND TRADEMARK OFFICE
CERTIFICATE OF CORRECTION

PATENT NO. : 10,287,457 B2
APPLICATION NO. : 14/437453
DATED : May 14, 2019
INVENTOR(S) : Rebecca Dylla-Spears et al.

Page 1 of 1

It is certified that error appears in the above-identified patent and that said Letters Patent is hereby corrected as shown below:

On the Title Page

Item [72], delete "Rebecca Dylia-Spears, Dublin, CA (US);" and insert -- Rebecca Dylla-Spears, Dublin, CA (US); -- therefor Signed and Sealed this
Twenty-fifth Day of June, 2019

Andrei Iancu
*Director of the United States Patent and Trademark Office*